United States Patent [19]

Lundberg et al.

[11] 4,447,338

[45] May 8, 1984

[54] DRILLING MUD VISCOSIFICATION AGENTS BASED ON SULFONATED IONOMERS

[75] Inventors: Robert D. Lundberg, Bridgewater, N.J.; Thad O. Walker, Humble; Charles P. O'Farrell, Houston, both of Tex.; Henry S. Makowski, deceased, late of Scotch Plains, N.J., by Patricia H. Makowski, executrix

[73] Assignee: Exxon Research and Engineering Co., Florham Park, N.J.

[21] Appl. No.: 292,235

[22] Filed: Aug. 12, 1981

[51] Int. Cl.$^3$ .............................................. C09K 7/06
[52] U.S. Cl. .............................. 252/8.5 M; 252/8.5 P
[58] Field of Search .................... 252/8.5 M, 8.5 P

[56] References Cited

U.S. PATENT DOCUMENTS

| | | | |
|---|---|---|---|
| 2,099,825 | 11/1937 | Rolshausen et al. | 252/8.5 |
| 2,552,775 | 5/1951 | Fischer et al. | 252/8.5 |
| 2,650,905 | 9/1953 | Fordyce et al. | 252/8.5 |
| 2,702,787 | 2/1955 | Freeland | 252/8.5 |
| 2,743,233 | 4/1956 | Fisher | 252/8.5 |
| 2,801,967 | 8/1957 | Wilson | 252/8.5 |
| 3,252,903 | 5/1966 | Crittendon | 252/8.5 |
| 3,634,235 | 1/1972 | Wilson et al. | 252/8.5 |
| 3,642,728 | 2/1972 | Canter | 525/354 X |
| 3,931,021 | 1/1976 | Lundberg | 252/32.5 |
| 4,153,588 | 5/1979 | Makowski et al. | 524/399 X |

*Primary Examiner*—Herbert B. Guynn
*Attorney, Agent, or Firm*—Richard E. Nanfeldt

[57] ABSTRACT

A new family of viscosification agents based on sulfonated ionomers is described for oil-based drilling muds. The resultant muds display good viscosity characteristics and good stability when formulated from ionomers having an appropriate sulfonate level, cation type, and cosolvent content.

10 Claims, No Drawings

DRILLING MUD VISCOSIFICATION AGENTS BASED ON SULFONATED IONOMERS

FIELD OF THE INVENTION

A new family of viscosification agents based on sulfonated ionomers is described for oil-based drilling muds. The resultant muds display good viscosity characteristics and good stability when formulated from ionomers having an appropriate sulfonate level, cation type, and cosolvent content.

BACKGROUND OF THE INVENTION

In the field of drilling in the exploration for oil and gas, an important component is that of the formulation of drilling muds. Drilling muds are the fluids which are used to maintain pressure, cool drill bits, and lift cuttings from the holes and vary in composition over a wide spectrum. Generally, drilling muds are based on aqueous formulations or oil-based formulations.

A conventional oil-based drilling mud formulation is comprised of basically the following ingredients: oil (generally No. 2 diesel fuel), emulsifying agents (alkaline soaps of fatty acids), wetting agents (dodecylbenzene sulfonate), water, barite or barium sulfate, (weighting agent), asbestos (employed as viscosification agent), amine treated clays (also as viscosification agent).

The above combination of ingredients is generally formulated to possess various weights based primarily on amount of barite added. For example, a typical drilling mud can vary in specific gravity from a range of about 7 lbs. per gallon up to 17 lbs. per gallon or even greater. This variation in specific gravity is primarily controlled by the amount of barite added. The above formulations perform adequately in a number of applications, primarily those where the use of oil-based drilling muds is dictated by the lack of stability of the formation in which drilling is taking place. For example, in various types of shale formation, the use of conventional water-based muds can result in a deterioration and collapse of the shale formation. The use of the oil-based formulations circumvents this problem. However, it is observed that the current oil-based drilling muds have some significant disadvantages. One disadvantage is that the incorporation of asbestos or asbestos fines can incur significant health problems both during the mud formulation and potentially during the subsequent use of such formulations. Therefore, it is desirable to eliminate the use of asbestos completely in such drilling muds. On the other hand, the use of substitutes for asbestos in this application heretofore has not been particularly successful in that the resulting viscosification agents must maintain adequate viscosities under the drilling conditions which can involve high temperature and high shear conditions.

This invention describes an approach to viscosification of oil-based drilling muds which permits the substitution of sulfonated ionomers for asbestos fines. The resulting polymer-modified drilling muds display viscosities which are in a desirable range for drilling mud applications, good viscosities at retention after aging at temperatures as high as 325° F. for 24 hours.

The types of sulfonated polymers that are envisioned in the present invention include sulfonated Butyl rubber, sulfonated EPDM terpolymers, copolymers of butadiene and metal sulfonate monomers, sulfonated polypentanamer and other sulfonated polymers which are described in U.S. Application Ser. No. 930,044, filed Aug. 1, 1978, which is incorporated herein by reference. These polymers possess suitable solubilities in the drilling mud environment.

Sulfonated EPDM has been described in other applications U.S. Ser. Nos. 855,756, filed Nov. 29, 1977, now abandoned; 855,724, filed Nov. 29, 1977, now U.S. Pat. No. 4,153,588; and 855,701, filed Nov. 29, 1977, now abandoned, which are hereby incorporated by reference. It is preferred that the EPDM employed in this invention be non crystalline or of a relatively low level of crystallinity so as to permit ready dissolution of the sulfonated EPDM in the oils of choice. Thus, the level of ethylene in the EPDM, which controls the level of crystallinity in this polymer, can range from approximately 30 wt. % ethylene up to about 65 wt. % ethylene in order to get adequate solubility of the sulfonated polymer. Higher ethylene levels in the EPDM can be employed and are within the scope of this invention.

SUMMARY OF THE INVENTION

The present invention relates to sulfonated elastomer polymers which function as viscosification agents when added to oil-based drilling muds which are the fluids used to maintain pressure, cool drill bits, and lift cutting from the holes in the drilling operation for oil and gas wells. The sulfonated elastomeric polymers have about 5 to about 30 milliequivalents of sulfonate groups per 100 grams of the sulfonated polymer, wherein the sulfonated group is neutralized with a metallic cation or an amine or ammonium counterion. A polar cosolvent can optionally be added to the mixture of oil drilling mud and sulfonated elastomeric polymer, wherein the polar cosolvent increases the solubility of the sulfonated elastomeric polymer in the oil drilling mud by decreasing the strong ionic interactions between the sulfonate groups of the sulfonated elastomeric polymer.

GENERAL DESCRIPTION

The present invention describes a new class of viscosification agents for oil-based drilling muds which are used during operation of gas and oil wells, wherein these viscosification agents are sulfonated elastomeric polymers.

The oil-based drilling muds of the instant invention minimally comprise, but can also include other additives an organic liquid such as an oil, fresh water or salt water, a emulsifier, a wetting agent, a weighting material and sulfonated polymer. In general, the specific gravity of the oil-based drilling mud has a specific gravity of about 7 lbs. per gallon to about 20 lbs. per gallon, more preferably about 10 to about 16, and most preferably about 12 to about 16.

A typical oil-base drilling mud, as envisioned by the instant invention comprises: an oil; about 1 to about 10 parts by weight of water per 100 parts by weight of the oil, more preferably about 3 to about 5; about 20 to about 50 lb/barrel or bbl of an emulsifier and/or supplementary emulsifier to about 5 lb/bbl of a wetting agent weight material necessary to give the desired mud density; and about 0.25 to about 2 lb/bbl of a sulfonated polymer. Higher levels of sulfonated polymer can be employed but it is not normally economically attractive.

The oil employed in the oil-based drilling mud is generally a No. 2 diesel fuel, but it can be other commercial available hydrocarbon solvents such as kerosene, fuel oils or selected crude. If crudes are used, they should be weathered and must be free of emulsion breakers. (Emulsion breakers are chemicals often employed in separating crude oil from emulsified water.)

Typical, but non-limiting, examples of suitable emulsifiers which can be readily employed are magnesium or calcium soaps of fatty acids. Typical, but non-limiting, examples of a suitable wetting agent which can be readily employed is an alkylaryl sulfonate. Typical, but non-limiting, examples of a weighing material which can be readily employed is barite or a barium sulfate which may optionally be surface treated with other cations, such as calcium.

The neutralized sulfonated elastomeric polymers employed in the oil-based drilling muds are derived from unsaturated polymers which include low unsaturated elastomeric polymers such as Butyl rubber, or EPDM terpolymers and other sulfonated elastomers which are preferably neutralized.

Alternatively, other unsaturated polymers are selected from the group consisting of partially hydrogenated polyisoprenes, partially hydrogenated polybutadienes and Neoprene.

The expression "Butyl rubber", as employed in the specification and claims, is intended to include copolymers made from a polymerization reaction mixture having therein from 70 to 99.5% by weight of an isoolefin which has about 4 to 7 carbon atoms, e.g., isobutylene and about 0.5 to 30% by weight of a conjugated multiolefin having from about 4 to 14 carbon atoms, e.g., isoprene. The resulting copolymer contains 85 to 99.8% by weight of combined isoolefin and 0.2 to 15% of combined multiolefin.

Butyl rubber generally has a Staudinger molecular weight as measured by GPC of about 20,000 to about 500,000, preferably about 25,000 to about 40,000, especially about 100,000 to about 400,000 and a Wijs Iodine No. of about 0.5 to 50, preferably 1 to 15. The preparation of Butyl rubber is described in U.S. Pat. No. 2,356,128 which is incorporated herein by reference. For the purposes of this invention, the Butyl rubber may have incorporated therein from about 0.2 to 10% of combined multiolefin; preferably about 0.5 to about 6%; more preferably, about 1 to about 4%, e.g., 2%. Illustrative of such a Butyl rubber is Exxon Butyl 365 (Exxon Chemical Co.), having a mole percent unsaturation of about 2.0% and a Mooney viscosity (ML, 1+8, 212° F.) of about 40–50.

Low molecular weight Butyl rubbers, i.e., Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight as measured by GPC of about 25,000 to about 60,000.

The EPDM terpolymers are low unsaturated polymers having about 1 to about 10.0 wt. % olefinic unsaturation, more preferably about 2 to about 8, most preferably about 3 to 7 defined according to the definition as found in ASTM D-1418-64 and is intended to mean terpolymers containing ethylene and propylene in the backbone and a diene in the side chain. Illustrative methods for producing these terpolymers are found in U.S. Pat. No. 3,280,082; British Pat. No. 1,030,289 and French Pat. No. 1,386,600, which are incorporated herein by reference. The preferred polymers contain about 40 to about 75 weight % ethylene and about 1 to about 10 weight percent of a diene monomer, the balance of the polymer being propylene. Preferably, the polymer contains about 45 to about 70 wt. % ethylene, e.g., 50 wt. % and about 2.6 to about 8.0 wt. % diene monomer, e.g., 5.0 wt. %. The diene monomer is preferably a non-conjugated diene.

Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM terpolymer, is Vistalon 2504 (Exxon Chemical Co.) a terpolymer having a Mooney viscosity (ML, 1+8, 212° F.) of about 40 and having a ethylene content of about 50 wt. % and a 5-ethylidene-2-norbornene content of about 5.0 wt. %. The $\overline{M}n$ as measured by GPC of Vistalon 2504 is about 47,000, the $\overline{M}v$ as measured by GPC is about 145,000 and the $\overline{M}w$ as measured by GPC is about 174,000.

Another EPDM terpolymer, Vistalon 2504-20, is derived from Vistalon 2504 (Exxon Chemical Co.) by a controlled extrusion process, wherein the resultant Mooney viscosity at 212° F. is about 20. The $\overline{M}n$ as measured by GPC of Vistalon 2504-20 is about 26,000, the $\overline{M}v$ as measured by GPC is about 90,000 and the $\overline{M}w$ as measured by GPC is about 125,000.

Nordel 1320 (DuPont) is another terpolymer having a Mooney viscosity at 212° F. of about 25 and having about 53 wt. % of ethylene, about 3.5 wt. % of 1.4-hexadiene, and about 43.5 wt. % of propylene.

The EPDM terpolymers of this invention have a number average molecular weight ($\overline{M}n$) as measured by GPC of about 10,000 to about 200,000, more preferably of about 15,000 to about 100,000, most preferably of about 20,000 to about 60,000. The Mooney viscosity (ML, 1+8, 212° F.) of the EPDM terpolymer is about 5 to about 60, more preferably about 10 to about 50, most preferably about 15 to about 40. The $\overline{M}v$ as measured by GPC of the EPDM terpolymer is preferably below about 350,000 and more preferably below about 300,000. The $\overline{M}w$ as measured by GPC of the EPDM terpolymer is preferably below about 500,000 and more preferably below about 350,000.

The elastomeric polymers are sulfonated by a process in a non-reactive solvent such as a chlorinated aliphatic solvent, chlorinated aromatic hydrocarbon, an aromatic hydrocarbon, or an aliphatic hydrocarbon such aa carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a temperature of about −100° C. to about 100° C. for a period of time of about 1 to about 60 minutes, more preferably at room temperature for about 5 to about 45 minutes; and most preferably about 15 to 30. Typical sulfonating agents are described in U.S. Pat. Nos. 3,642,728 and 3,836,511, which are incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene or triethyl phosphate. The most preferred sulfonation agent for this invention is an acyl sulfate selected from the group consisting essentially of benzoyl, acetyl, propionyl or butyryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol or isopropanol, with an aromatic hydroxyl compound, such as phenol, a cycloaliphatic alcohol such as cyclohexanol or with water. The unneutralized sulfonated elastomeric polymer has about 5 to about 30 meq. sulfonate groups per 100 grams of sulfonated polymer, more preferably about 5 to about 25; and most preferably about 5 to about 15. The range of sulfonate content does vary over an extremely broad latitude; however, it has been observed that in those systems of high sulfonation level that there is great difficulty in dissolving the sulfonated polymers and there can be very adverse effects in terms of the interaction of the sulfonated polymer with the barite weighting agent and with the other components of the drilling mud. Therefore, there is clearly an optimum level of sulfonation content which may vary from one sulfonated backbone to another, but for sulfonated EPDM, it is in the most preferred embodiment of the invention as described above. The meq. of sulfonate groups/100 grams of polymer is determined by both titration of the polymeric sulfonate acid and Dietert Sulfur analysis. In the titration of the unneutralized sulfonate, the polymer is dissolved in solvent consisting of 95 parts by volume of toluene and 5 parts by volume of methanol at a concentration level of 50 grams per liter of solvent. The unneutralized sulfonate is titrated with ethanolic sodium hydroxide to an Alizarin-Thymolphthalein end-point.

The unneutralized sulfonated polymer is gel-free and hydrolytically stable. Gel is measured by stirring a given weight of polymer in a solvent comprised of 95 toluene-5-methanol at a concentration of 5 wt. %, for 24 hours, allowing the mixture to settle, withdrawing a weighed sample of the supernatant solution and evaporating to dryness.

Hydrolytically stable means that the unneutralized sulfonate will not be eliminated under neutral or slightly basic conditions to a neutral moiety which is incapable of being converted to highly ionic functionality.

Neutralization of the unneutralized sulfonate groups of the sulfonated elastomeric polymer is done by the addition of a solution of a basic salt to the unneutralized sulfonated elastomeric polymer dissolved in the mixture of the aliphatic alcohol and non-reactive solvent. The basic salt is dissolved in a binary solvent system consisting of water and/or an aliphatic alcohol. The counterion of the basic salt is selected from the group consisting of antimony, iron, aluminum, lead and Groups IA, IIA, IB, or IIB of the Periodic Table of Elements and mixtures thereof, as well as ammonium and amine counterions. The preferred cations include zinc, magnesium, sodium, lead, barium, calcium, and ammonium cations, wherein zinc, magnesium and sodium are the most preferred cations. The anion of the basic salt is selected from a carboxylic acid having from about 1 to about 4 carbon atoms, a hydroxide, or alkoxide and mixtures thereof. The preferred neutralizing agent is a metal acetate, more preferably zinc acetate. Sufficient metal salt of the carboxylic acid is added to the solution of the acid form of the elastomeric polymer to effect neutralization. It is preferable to neutralize at least 95% of the acid groups, more preferably about 98%, most preferably 100%.

Examples of metal oxides useful in preparing metal sulfonates are MgO, CaO, BaO, ZnO, Ag$_2$O, PbO$_2$ and Pb$_3$O$_4$. Useful examples of metal hydroxides used in preparing metal sulfonated elastomeric polymers are NaOH, KOH, LiOH, Mg(OH)$_2$ and Ba(OH)$_2$.

It has been observed that the sulfonated polymers formed by sulfonation often do not readily dissolve in hydrocarbons such as diesel oil or solvent 100 neutral and similar hydrocarbon solvents. The reason that these materials do not readily dissolve is due to the strong ionic interactions which persist in these sulfonated polymers.

It has been observed that the use of appropriate polar cosolvent can dramatically aid in the preparation of such solutions. The need for such cosolvents is most dramatically demonstrated with sulfonated polymers having sulfonate contents significantly above 15 milliequivalents per 100 grams of the sulfonated polymer. Examples of such cosolvents are aliphatic alcohol hexanol, decanol, and tridecyl alcohol employed at levels of from about 1 up to 20 parts by weight per 100 parts by weight of the oil employed in the drilling mud. The use of these cosolvents permits a more rapid dissolution process and a more complete solution from polymers which would normally be insoluble in a hydrocarbon diluent. It has also been observed at lower sulfonate levels, that is, 5 to 15 milliequivalents or even higher per 100 grams of sulfonated polymer, that these polymers can be dissolved in the absence of such cosolvents. Cosolvents which are suitable in this invention have been described in U.S. Application Ser. No. 930,044 which is herein incorporated by reference.

The polar cosolvent will have a solubility parameter of at least about 8.5, more preferably at least about 9.0 and may comprise from 0.1 to 40, preferably 0.5 to 20 weight percent of the total mixture of organic liquid, ionomeric polymer, and polar cosolvent. The solvent system of polar cosolvent and organic liquid in which the neutralized sulfonated polymer is dissolved contains less than about 15 weight percent of the polar cosolvent, more preferably about 2 to 10 weight percent, and most preferably about 2 to about 5 weight percent. The viscosity of the solvent system is less than about 1,000 cps, more preferably less than about 800 cps and most preferably less than about 500 cps.

Normally, the polar cosolvent will be a liquid at room temperature; however, this is not a requirement. It is preferred, but not required, that the polar cosolvent be soluble or miscible with the organic liquid at the levels employed in this invention. The polar cosolvent is selected from the group consisting essentially of alcohols, amines, di or trifunctional alcohols, amides, acetamides, phosphates, or lactones and mixtures thereof. Especially preferred polar cosolvents are aliphatic alcohols such as butanol, hexanol, octanol, decanol, dodecanol tridecyl alcohol, 2-ethyl hexanol etc.

Alternatively, a latex of a sulfonated polymer is described in U.S. Pat. Nos. 3,912,683 and 4,007,149, which are herein incorporated by reference, could be readily employed as a convenient method of introducing the sulfonated polymer into the oil-based drilling mud.

DETAILED DESCRIPTION OF THE PREFERRED EMBODIMENT

Example 1

A commercial EPDM (100 grams) containing about 50 weight percent ethylene and 5 weight percent 5-ethylidene-2-norbornene and possessing a Mooney viscosity (ML, 1+8, 212° F.) of about 40 was dissolved in 1000 ml. of hexane. To this solution was added 1.65 ml. (16.2 mmoles) of acetic anhydride. Then 0.56 ml. (10.0 mmoles) of concentrated sulfuric acid was dripped in at room temperature. After 30 minutes, sulfonation was terminated and the sulfonation product was neutralized through the addition of a solution of 2.20 grams (20.0 meq.) of $Zn(OOCCH_3)_2 \cdot 2H_2O$ in 80 ml. methanol/4 ml. water. Antioxidant 2246 (0.5 g) was added. The polymer was isolated through solvent flashing in hot water. The mass of product was pulverized and washed with water in a Waring blender. The wet crumb was dried in a laboratory aeromatic fluid-bed dryer.

The product analyzed for 0.42 weight percent sulfur (13.3 meq/100 g. polymer) and 0.59 weight percent zinc (18.0 meq./100 g. polymer). It was soluble in diesel fuel, a Brookfield viscosity of 200 centipoise at 3.0 rpm.

Example 2

Example 1 was repeated exactly that neutralization was effected with a solution of 2.14 grams (20.0 meq.) of $Mg(OOCCH_3)_2 \cdot 4H_2O$ in 80 ml. methanol ¼ ml. water.

The product analyzed for 0.36 weight percent sulfur (11.3 meq./100 g. polymer) and 0.22 weight percent magnesium (18.1 meq./100 g. polymer). It was soluble in diesel fuel at a concentration of 1 g./100 ml. At room temperature, the solution possessed a Brookfield viscosity of 120 centipoise at 3.0 rpm.

Example 3

An EPDM containing about 70 weight percent ethylene and 5 weight percent 5-ethylidene-2-norbornene was dissolved in hexane at a concentration of 100 g./liter by heating to reflux with agitation. Water present in the overall system was thereby removed. The solution was cooled to room temperature and acetic anhydride was added at a level of 7.39 ml. (7.98 g., 78.14 mmole) per 100 g. EPDM. Concentrated (95%) sulfur acid was slowly added at room temperature at a level of 33.25 mmoles $H_2DUSO_4$/100 g. EPDM. The acetic anhydride/$H_2SO_4$ molar ratio was thus 2.35.

After stirring for 30 minutes, the sulfonation was terminated and the sulfonated product was neutralized with a solution of 13.17 g. (120 meq.) $Zn(OOCCH_3)_2 \cdot 2H_2O$ in 80 ml. methanol/3 ml. water per 100 g. EPDM. After 30 minutes agitation, 8.52 g (30 mmoles) of stearic acid and 9.1 g. of Irganox 1010 per 100 g. EPDM was added, and stirring was continued for 60 minutes.

The resultant cement was steam stripped in a stirred batch steam stripper in such a way that a relatively uniform crumb was obtained free of solvent. The resultant water-wet crumb was dried in a fluid-bed dryer at a temperature of about 100° C.

Sulfur analysis showed the product to contain about 30 meq. sulfonate/100 g./EPDM. Infrared showed that the stearic acid added at a level of 30 mmole/100 g./EPDM was fully converted to zinc stearate.

To illustrate the successful use of sulfonated EPDM as oil mud viscosifiers, the following tests were conducted. These tests not only show that oil soluble sulfonated EPDM's are effective viscosifiers, but also show that the number of sulfonic acid groups pendant to the polymer backbone are very important in controlling the viscosity of the oil mud.

An oil-based drilling mud was prepared by conventional laboratory methods. The mud contained #2 diesel oil, fresh water, emulsifier, and weighting material. The mud was aged overnight at 150° F. to insure chemical equilibrium. Aliquots of the mud were then treated with unsulfonated EPDM and sulfonated EPDM containing different levels of sulfonate groups pendant to the polymer chain. These muds were then placed in an aging cell, pressurized to 200 PSI with nitrogen, and heated overnight at 350° F. The aging cells were cooled to room temperature, depressurized, and then the rheology of the muds were measured on a Fann Model 35 Viscometer at 115° F.

Table I shows that treatment of a 16 lb/gal. oil mud with a given concentration of EPDM has no effect on the viscosity of the mud.

The data in Table II shows that treatment of oil muds with sulfonated EPDM results in an increase in viscosity. This data also shows that the sulfonate level of the EPDM backbone plays an important role in the development of the viscosity profile. It is shown that the apparent viscosity increases as the sulfonate level decreases from 30 meq. to 10 meq. It appears that a maximum in the viscosity vs. sulfonate level relationship is obtained at the 10 meq. sulfonate level. A sulfonate level below 10 meq. results in a decrease in apparent viscosity.

The data also shows that the yield point increases as the sulfonate level is decreased reaching a maximum at 10 meq. sulfonate level. A sulfonate level below 10 meq. resulted in a decrease in yield point.

Quantitative data has shown that these apparent viscosity and yield point trends can be explained by a polymer-solids interaction. At the highest sulfonate level in a 16 lb./gal. mud, it has been found that only 37% of the polymer is in solution, whereas at the 10 meq. sulfonate level, 91% of the polymer is in solution. Similar trends would be expected in the intermediate weight (12 lb./gal.) oil muds.

The preferred apparent viscosity and yield point range for a 16 lb./gal. oil mud are 60–83 and 12–22 respectively. The data in Table II shows that a polymer containing 5 meq. of sulfonate would give viscosity characteristics within the specified limits.

For a 12 lb./gal. oil mud, the apparent viscosity and yield point ranges are 32–47 and 8–17, respectively. The data shows that the 5 meq. sulfonated polymer gives rheology values within experimental limits. By reducing the concentration of polymer rheology, values within the specified experimental limits could be obtained.

In summary, these data show that unsulfonated EPDM is not an affective viscosification agent for these oil-based drilling muds. Yet, if the sulfonate level is excessively high (greater than 30 meq/sulfonate/100 g. polymer), there can be excessive interaction between the polymer and other components of the drilling mud leading to undesirable consequences. Very desirable viscosification is achieved at lower sulfonate levels even at very low polymer concentrations.

TABLE I

VISCOSITY CHARACTERISTICS OF EPDM IN OIL MUDS

| Sample | Conc. lb/bbl | Mud Wt. lb/gal. | Fann Readings 600[2] | Fann Readings 300[3] | PV[4] CPS | YP[5] lb/100 ft[2] | Apparent Viscosity[6] |
|---|---|---|---|---|---|---|---|
| A | — | 16.0 | 170 | 88 | 82 | 6 | 85 |
| B | 0.12 | 16.0 | 159 | 82 | 77 | 5 | 79.5 |
| C | 0.24 | 16.0 | 193 | 100 | 93 | 7 | 96.5 |
| D | 0.48 | 16.0 | 159 | 82 | 77 | 5 | 79.5 |

A 16 lb/gal base mud
B 16 lb/gal base mud with EPDM
C 16 lb/gal base mud with EPDM
D 16 lb/gal base mud with EPDM
[1] gm/350 cc
[2] Fann Viscometer reading 600 RPM's
[3] Fann Viscometer reading 300 RPM's
[4] Fann Reading 600 RPM's — Fann Reading 300 RPM's
[5] Fann Reading 300 RPM's — PV
[6] $\frac{\text{Fann 600 RPM reading}}{2}$

TABLE II

VISCOSITY CHARACTERISTICS OF THIONOMERS IN OIL MUDS

| Sample | Polymer Conc. lb/bbl | Mud Wt. lb/gal. | Fann Readngs 600 RPM | Fann Readngs 300 RPM | PV CPS | YP lb/100 ft | Apparent Viscosity |
|---|---|---|---|---|---|---|---|
| A | — | 16 | 104 | 53 | 51 | 2 | 52 |
| B | 0.48 | 16 | 154 | 91 | 63 | 28 | 77 |
| C | 0.48 | 16 | 158 | 96 | 62 | 34 | 79 |
| D | 0.48 | 16 | 174 | 108 | 66 | 42 | 87 |
| E | 0.48 | 16 | 137 | 75 | 62 | 13 | 69 |
| F | — | 12 | 87 | 47 | 40 | 7 | 43.5 |
| G | 0.48 | 12 | 106 | 64 | 42 | 22 | 53 |
| H | 0.48 | 12 | 116 | 77 | 39 | 38 | 58 |
| I | 0.48 | 12 | 129 | 87 | 42 | 45 | 64.5 |
| J | 0.48 | 12 | 117 | 69 | 48 | 21 | 58.5 |

A 16 lb/gal base mud
B 16 lb/gal base mud with 30 meq. polymer Mg salt
C 16 lb/gal base mud with 15 meq. polymer Mg salt
D 16 lb/gal base mud with 10 meq. polymer Mg salt
E 16 lb/gal base mud with 5 meq. polymer Mg salt
F 12 lb/gal base mud
G 12 lb/gal base mud with 30 meq. polymer Mg salt
H 12 lb/gal base mud with 15 meq. polymer Mg salt
I 12 lb/gal base mud with 10 meq. polymer Mg salt
J 12 lb/gal base mud with 5 meq. polymer Mg salt

We claim:

1. An oil base drilling mud which comprises:
   (a) an organic liquid selected from the group consisting of a diesel fuel, kerosene, fuel oil and crude oil;
   (b) about 1 to about 10 parts by weight of water per 100 parts by weight of the organic liquid;
   (c) about 20 to about 50 lb/bbl of at least one emulsifier;
   (d) weighting material of sufficient quantity necessary to achieve the desired density; and
   (e) about 0.25 to abut 2 lb/bbl of a water insoluble neutralized sulfonated elastomer, said neutralized sulfonated polymer elastomer having about 5 to about 30 meg. of sulfonate groups per 100 grams of the neutralized sulfonated polymer elastomer, said neutralized sulfonated elastomer being derived from an elastomeric polymer selected from the group consisting of EPDM terpolymers and butyl rubber, said EPDM terpolymers having a number average molecular weight of about 10,000 to about 200,000 and said butyl rubber having a Staudinger molecular weight of about 20,000 to about 500,000.

2. An oil-based drilling mud according to claim 1 wherein said emulsifier is a magnesium or calcium soap of a fatty acid.

3. An oil-based drilling mud according to claim 1 further including a wetting agent.

4. An oil-based drilling mud according to claim 3 wherein said wetting agent is an alkylaryl sulfonate.

5. An oil-based drilling mud according to claim 1 wherein said weighing material is barite or barium sulfate.

6. An oil-based drilling mud according to claim 1 wherein said neutralized sulfonated elastomeric polymer is EPDM terpolymer.

7. An oil-based drilling mud according to claims 1, 5 or 6 wherein said sulfonate groups are neutralized with a counterion selected from the group consisting of ammonium, amines, antimony, iron, aluminum, lead and Groups I-A, II-A, I-B and II-B of the Periodic Table of Elements.

8. An oil-based drilling mud according to claims 1, 5 or 6 further including a cosolvent having a solubility parameter of at least 8.5.

9. An oil-based drilling mud according to claim 8, wherein said cosolvent is an aliphatic alcohol.

10. An oil-based drilling mud according to claim 1, 5 or 6 further including a cosolvent having a solubility parameter of at least 9.0.

* * * * *